United States Patent
Golgiri et al.

(10) Patent No.: US 11,530,933 B1
(45) Date of Patent: Dec. 20, 2022

(54) VEHICLE NAVIGATION

(71) Applicant: Ford Global Technologies, LLC, Dearborn, MI (US)

(72) Inventors: Hamid M. Golgiri, Livonia, MI (US); Ahmed Benmimoun, Aachen (DE); Brian George Buss, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 17/399,551

(22) Filed: Aug. 11, 2021

(51) Int. Cl.
 *G01C 21/00* (2006.01)
(52) U.S. Cl.
 CPC ................ *G01C 21/3807* (2020.08)
(58) Field of Classification Search
 CPC ........................ G01C 21/38–3896
 See application file for complete search history.

(56) References Cited

U.S. PATENT DOCUMENTS

| | | | |
|---|---|---|---|
| 2019/0257659 A1 | 8/2019 | Moteki et al. | |
| 2019/0371175 A1 | 12/2019 | Joos et al. | |
| 2020/0207338 A1* | 7/2020 | Cho | B62D 15/0285 |
| 2021/0190537 A1* | 6/2021 | Gustafsson | G01S 17/89 |

FOREIGN PATENT DOCUMENTS

| | | |
|---|---|---|
| DE | 102014015073 A1 | 4/2016 |
| KR | 20200081571 A | 7/2020 |

* cited by examiner

*Primary Examiner* — Aaron L Troost
(74) *Attorney, Agent, or Firm* — Frank A. MacKenzie; Bejin Bieneman PLC

(57) ABSTRACT

While a vehicle is in an area, a stored map uncertainty value of map data for the area is retrieved. The stored map uncertainty value gives a range of uncertainty for at least one indicator of a travel path specified by the map data. Upon estimating the travel path and a vehicle pose, a dynamic map uncertainty value is determined based on a pose uncertainty value and a travel path uncertainty value. The pose uncertainty value gives a range of uncertainty for the vehicle pose in three degrees-of-freedom based on vehicle sensor data, and the travel path uncertainty value gives a range of uncertainty for the at least one indicator of the estimated travel path based on vehicle sensor data. Upon determining that the dynamic map uncertainty value is less than the stored map uncertainty value, the map data is updated based on the vehicle sensor data. Upon updating the map data, the vehicle is operated based on the updated map data.

20 Claims, 7 Drawing Sheets

VEHICLE NAVIGATION

BACKGROUND

A vehicle can be equipped with electronic and electro-mechanical components, e.g., computing devices, networks, sensors, and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
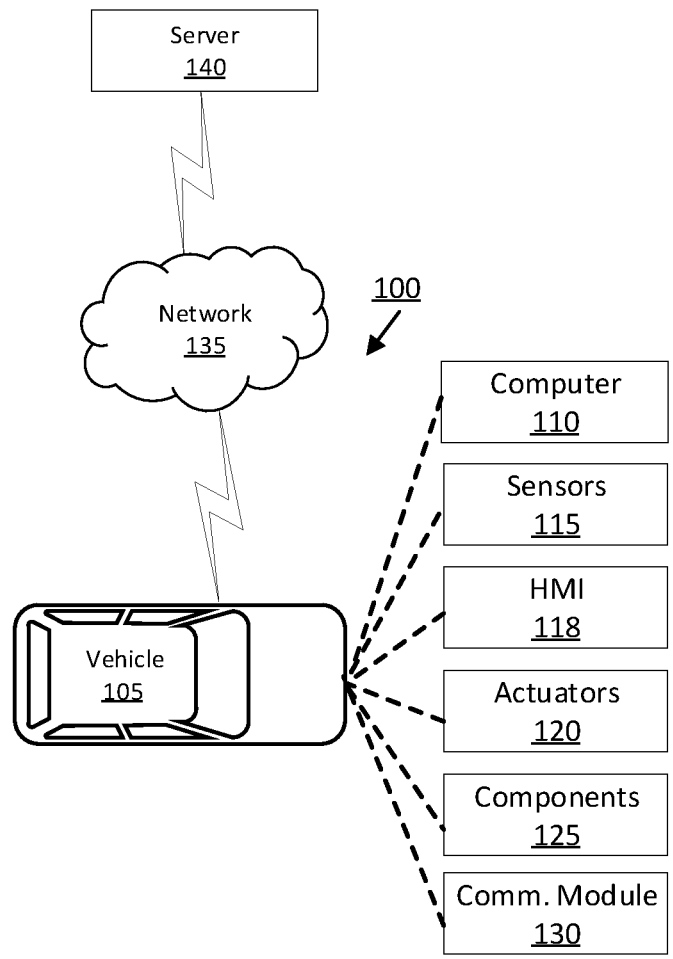
FIG. 1 is a block diagram illustrating an example control system for a vehicle.

A vehicle computer can operate a vehicle along a stored travel path in an operating area that includes a plurality of sub-areas, e.g., parking spaces. While operating along the stored travel path, the vehicle computer can search for available sub-areas, e.g., unoccupied parking spaces, via image data. The vehicle computer can, for example, retrieve the stored travel path from map data for the operating area. The stored travel path can be generated by recording, via vehicle sensors, a travel path along which a user previously operated the vehicle. However, due to noise, limitations in resolution of the sensor data, and/or inaccuracies in the sensor data, a location of an actual lateral boundary of the travel path, i.e., a boundary defining a side of the travel path and extending along a length of the travel path, may vary from a location of the lateral boundary specified by the map data. The vehicle computer may repeatedly update a path of the vehicle to compensate for such a variation between the stored map data and current sensor data and thereby maintain the vehicle in the travel path. Repeatedly updating the path of the vehicle can result in undesirable vehicle operations, such as the vehicle operating along an oscillating path within the travel path.

Advantageously, the vehicle computer can determine a dynamic map uncertainty value, as discussed herein. The vehicle computer can then compare the dynamic map uncertainty value to a stored map uncertainty value. If the dynamic map uncertainty value is greater than or equal to the stored may uncertainty value, then the vehicle computer operates the vehicle along the travel path based on the map data. If the dynamic map uncertainty value is less than the stored map uncertainty value, then the vehicle computer can operate the vehicle along the travel path based on the vehicle sensor data. Determining to operate the vehicle based on stored map data or to update stored map data using vehicle sensor data based on whether the stored map data or the sensor data has a lower uncertainty value allows the vehicle computer to ignore the less certain data, which can prevent the vehicle computer from performing undesirable operations to compensate for differences between the sensor data and the map data.

A system includes a computer including a processor and a memory, the memory storing instructions executable by the processor to, while a vehicle is in an area, retrieve a stored map uncertainty value of map data for the area, wherein the stored map uncertainty value gives a range of uncertainty for at least one indicator of a travel path specified by the map data; at least one indicator. The instructions further include instructions to, upon estimating the travel path and a vehicle pose, determine a dynamic map uncertainty value based on a pose uncertainty value and a travel path uncertainty value. The pose uncertainty value gives a range of uncertainty for the vehicle pose in three degrees-of-freedom based on vehicle sensor data, and the travel path uncertainty value gives a range of uncertainty for the at least one indicator of the estimated travel path based on vehicle sensor data. The instructions further include instructions to, upon determining that the dynamic map uncertainty value is less than the stored map uncertainty value, update the map data based on the vehicle sensor data. The instructions further include instructions to upon updating the map data, operate the vehicle based on the updated map data.

The instructions can further include instructions to, upon determining that the dynamic map uncertainty value is greater than or equal to the stored map uncertainty value, maintain the map data.

The instructions can further include instructions to operate the vehicle based on the map data.

The instructions can further include instructions to, upon failing to retrieve the stored map uncertainty value, update the map data based on the vehicle sensor data.

The instructions can further include instructions to estimate the vehicle pose based on output of a Kalman filter.

The instructions can further include instructions to estimate the first lateral boundary of the travel path based on a first set of detection points. The instructions can further include instructions to estimate the second lateral boundary of the travel path based on a second set of detection points spaced from the first set. The instructions can further include instructions to determine the travel path uncertainty value based on a first best fit line for the first set of detection points and a second best fit line for the second set of detection points.

The instructions can further include instructions to determine, based on the vehicle sensor data, the first lateral boundary and the second lateral boundary of the travel path in coordinates relative to a vehicle-coordinate system. The instructions can further include instructions to transform, based on the estimated vehicle pose, the first and second lateral boundaries to coordinates relative to a real-world coordinate system, thereby generating transformed lateral boundaries.

The instructions can further include instructions to determine a center line of the travel path in coordinates relative to the real-world coordinate system based on the transformed first and second lateral boundaries. The instructions can further include instructions to operate the vehicle along the center line of the travel path.

The instructions can further include instructions to, upon updating the map data, update the stored map uncertainty value based on the dynamic map uncertainty value.

The instructions can further include instructions to provide the updated map data, including the updated map uncertainty value, to a remote computer.

The system can include the remote computer having a second processor and a second memory, the second memory storing instructions executable by the second processor to update a map based on aggregated data including updated map data from a plurality of vehicles. The instructions can further include instructions to update the stored map uncertainty value based on aggregated data including the updated map uncertainty values from a plurality of vehicles.

The system can include a remote computer having a second processor and a second memory, the second memory storing instructions executable by the second processor to generate a map based on aggregated data including map data from a plurality of vehicles.

A method includes, while a vehicle is in an area, retrieving a stored map uncertainty value of map data for the area, wherein the stored map uncertainty value gives a range of uncertainty for at least one indicator of a travel path specified by the map data. The method further includes upon estimating the travel path and a vehicle pose, determining a dynamic map uncertainty value based on a pose uncertainty value and a travel path uncertainty value. The pose uncertainty value gives a range of uncertainty for the vehicle pose in three degrees-of-freedom based on vehicle sensor data, and the travel path uncertainty value gives a range of uncertainty for the at least one indicator of the estimated travel path based on vehicle sensor data. The method further includes, upon determining that the dynamic map uncertainty value is less than the stored map uncertainty value, updating the map data based on the vehicle sensor data. The method further includes, upon updating the map data, operating the vehicle based on the updated map data.

The method can further include, upon determining that the dynamic map uncertainty value is greater than or equal to the stored map uncertainty value, operating the vehicle based on the map data.

The method can further include, upon failing to retrieve the stored map uncertainty value, updating the map data based on the vehicle sensor data.

The method can further include estimating the vehicle pose based on output of a Kalman filter.

The method can further include estimating the first lateral boundary of the travel path based on a first set of detection points. The method can further include estimating the second lateral boundary of the travel path based on a second set of detection points spaced from the first set. The method can further include determining the travel path uncertainty value based on a first best fit line for the first set of detection points and a second best fit line for the second set of detection points.

The method can further include determining, based on the vehicle sensor data, the first lateral boundary and the second lateral boundary of the travel path in coordinates relative to a vehicle-coordinate system. The method can further include transforming, based on the estimated vehicle pose, the first and second lateral boundaries and the center line to coordinates relative to a real-world coordinate system. The method can further include determining a center line of the travel path in coordinates relative to the real-world coordinate system based on the transformed first and second lateral boundaries. The method can further include operating the vehicle along the center line of the travel path.

The method can further include, upon updating the map data, updating the stored map uncertainty value based on the dynamic map uncertainty value.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4C, an example control system 100 includes a vehicle 105. A vehicle computer 110 in the vehicle 105 receives data from sensors 115. The vehicle computer 110 is programmed to, while the vehicle 105 is in an operating area 200, retrieve a stored map uncertainty value of map data for the operating area 200. The stored map uncertainty value gives a range of uncertainty for at least one indicator each of a first lateral boundary 220a and a second lateral boundary 220b of a travel path 215 specified by the map data. The vehicle computer 110 is further programmed to, upon estimating the travel path 215 and a vehicle 105 pose, determine a dynamic map uncertainty value based on a pose uncertainty value and a travel path 215 uncertainty value. The pose uncertainty value gives a range of uncertainty for the vehicle 105 pose in three degrees-of-freedom based on vehicle 105 sensor 115 data, and the travel path 215 uncertainty value gives a range of uncertainty for the at least one indicator each of the first lateral boundary 220a and the second lateral boundary 220b of the estimated travel path 215 based on vehicle 105 sensor 115 data. The vehicle computer 110 is further programmed to, upon determining that the dynamic map uncertainty value is less than the stored map uncertainty value, update the map data based on the vehicle 105 sensor 115 data. The vehicle computer 110 is further programmed to, upon updating the map data, operate the vehicle 105 based on the updated map data.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(s), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g., front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI). The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communication module could include one or more mechanisms, such as a transceiver, by which the computers of vehicles may communicate, including any desired combination of wireless (e.g., cellular, wireless, satellite, microwave, and radio frequency) communication mechanisms and any desired network topology (or topologies when a plurality of communication mechanisms are utilized). Exemplary communications provided via the communications module include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
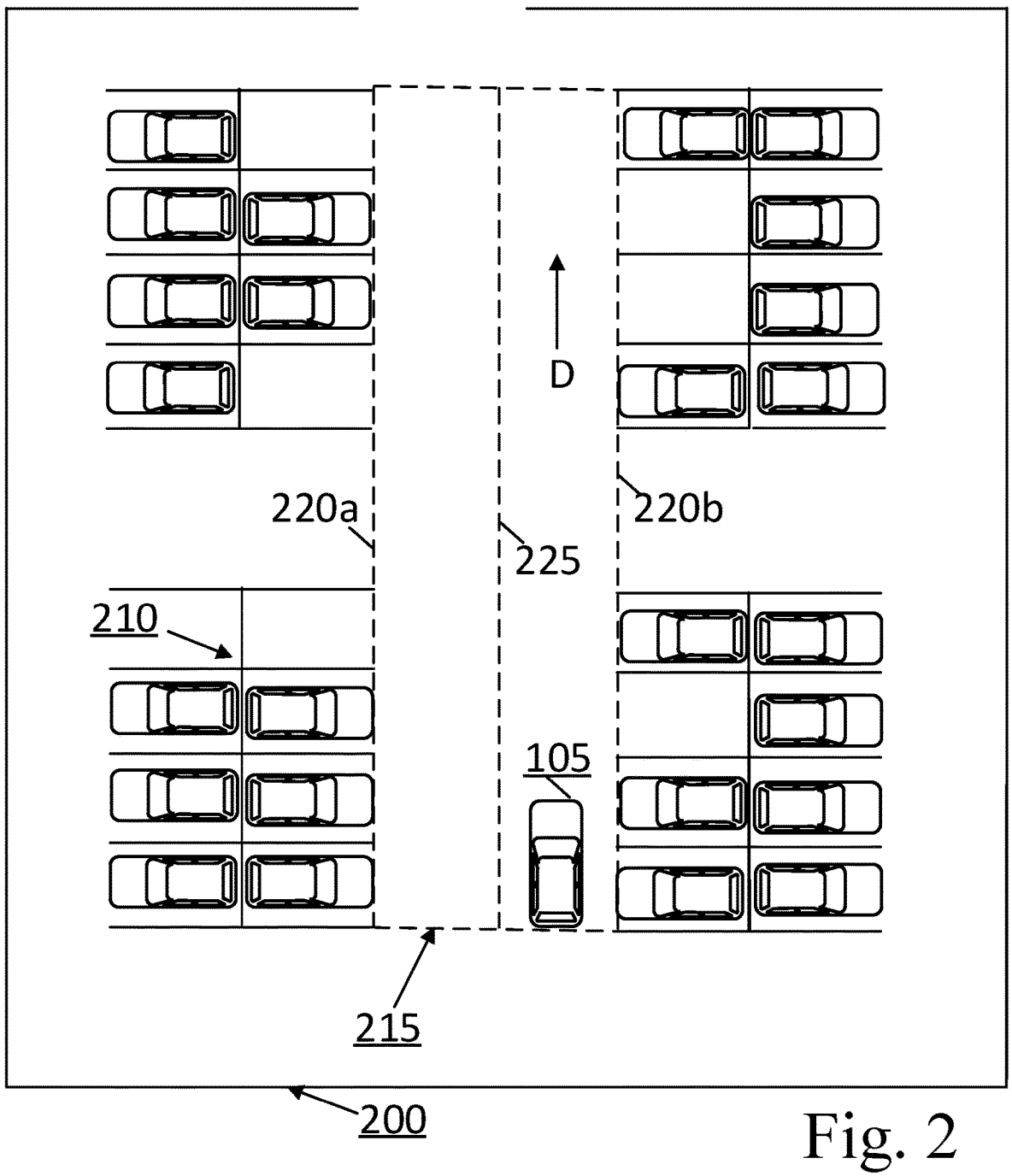
FIG. 2 is a diagram illustrating determining an example travel path according to the system of FIG. 1.

FIG. 2 is a diagram illustrating a vehicle 105 operating in an example operating area 200 that includes marked sub-areas 210 (e.g., parking spaces) for vehicles 105. The vehicle computer 110 may be programmed to determine whether the vehicle 105 is in an operating area 200. An operating area 200 is a specified area of ground surface for operating and/or stowing a vehicle 105. The operating area 200 may be on a street or road, e.g., an area alongside a curb or an edge of the street, a parking lot or structure or portion thereof, etc. A sub-area 210 may, for example, be a parking space indicated by conventional markings, e.g., painted lines on a ground surface, and conventional image recognition techniques can be employed by the vehicle computer 110 to identify the sub-area 210.

The vehicle computer 110 may be programmed to determine that the vehicle 105 is within the operating area 200 based on sensor 115 data. For example, the vehicle computer 110 may be programmed to determine that the vehicle 105 is within the operating area 200 by any suitable technique for determining a location of the vehicle 105, e.g., GPS-based geo-fencing. A geo-fence herein has the conventional meaning of a boundary for an area defined by sets of geo-coordinates. In such an example, the geo-fence specifies a perimeter of the operating area 200. The vehicle computer 110 can then determine that the vehicle 105 is within the operating area 200 based on the location data of the vehicle 105 indicating the vehicle 105 is within the geo-fence. As another example, the vehicle computer 110 may determine whether the vehicle 105 is in the operating area 200 based on data, e.g., map data, received from the remote server computer 140. For example, the vehicle computer 110 may receive a location of the vehicle 105, e.g., from a sensor 115, a navigation system, a remote server computer 140, etc. The vehicle computer 110 can compare the location of the vehicle 105 to the map data, e.g., to determine whether the vehicle 105 is in the operating area 200 specified in the map data.

Upon determining that the vehicle 105 has moved into the operating area 200, the vehicle computer 110 can access map data of the operating area 200 from a memory of the vehicle computer 110. The vehicle computer 110 can receive the map data of the operating area 200, e.g., from a remote server computer 140. The map data can, for example, specify one or more travel paths 215 within the operating area 200 and a stored map uncertainty value based on aggregated data (as discussed below). A travel path 215 is a specified area within an operating area 200, e.g., a lane or an aisle, for vehicle 105 travel. The travel path 215 is defined by a first lateral boundary 220a and a second lateral boundary 220b spaced from the first lateral boundary 220a. The first and second lateral boundaries 220 may be defined by lines, e.g., straight, curved, jagged, irregular, etc. from one end of the travel path 215 to another end of the travel path 215. One or more sub-areas 210 may be positioned alongside the first lateral boundary 220a and/or the second lateral boundary 220b. The lateral boundaries 220 may be partly defined by objects, e.g., parked vehicles, a curb, a building, etc., and/or conventional markings, i.e., painted lines on the ground, e.g., sub-area 210 markings.

A travel path 215 may be unidirectional, i.e., provided for vehicle travel in one direction along the travel path 215, or bidirectional, i.e., provided for vehicle travel in opposing directions along the travel path 215. For example, the travel path 215 may provide for a direction of travel D from one end of the travel path 215 to the other end of the travel path 215. In an example in which the travel path 215 is bidirectional, the travel path 215 provides for a second direction of travel (not shown) opposing the direction of travel D. The travel path 215 may, for example, accommodate only one vehicle, i.e., such that multiple vehicles can travel in the travel path 215 one in front of the other, but not abreast of, i.e., laterally adjacent, one another. Alternatively, the travel path 215 may accommodate multiple vehicles, i.e., such that multiple vehicles can travel in the travel path 215 abreast of one another.

A "stored map uncertainty value," as that term is used herein, is a numerical value, e.g., an integer, a real number, a percentage, etc., that gives a range of uncertainty for an indicator of a travel path 215 specified by the map data within the operating area 200. An "indicator" in the context of this document means a line, e.g., a straight line, a curved line, a plurality of lines splined together, etc., representing a physical measurement of, and/or specifying a physical limitation for, a travel path 215. For example, the stored map uncertainty value may represent a margin of error for a location of the indicator specified by the map data. That is, the stored map uncertainty value may represent a distance from a location for an indicator specified by the map data within which the indicator may be actually located. Non-limiting examples of indicators of the travel path 215 include a lateral boundary 220, a longitudinal boundary, i.e., a boundary defining an end of the travel path 215 and extending across the travel path 215, a length, a width, a centerline 225, etc.

The map data may specify a plurality of stored map uncertainty values, e.g., one stored map uncertainty value for respective indicators included in the map data. In such an example, the stored map uncertainty values may be specified in a covariance matrix that corresponds to output from a Kalman filter 305 (as discussed below). As another example, the map data may specify one stored map uncertainty value. In such an example, the one stored map uncertainty value may be determined by combining (e.g., averaging and/or some other statistical measure) the plurality of stored map uncertainty values for the respective indicators. Upon accessing the map data of the operating area 200, the vehicle computer 110 determines whether to operate the vehicle 105 based on the map data. The vehicle computer 110 can retrieve the stored map uncertainty value from the map, e.g., from metadata specifying the stored map uncertainty value. Upon retrieving the stored map uncertainty value, the vehicle computer can compare the stored map uncertainty value to a dynamic map uncertainty value. A "dynamic map uncertainty value," as that term is used herein, is a numerical value, e.g., an integer, a real number, a percentage, etc., that gives a range of uncertainty for an indicator of the travel path 215 determined based on sensor 115 data within the operating area 200. For example, the dynamic map uncertainty value may represent a margin of error for a location of the indicator determined based on sensor 115 data. That is, the dynamic map uncertainty value may represent a distance from a location for an indicator determined by the vehicle computer 110 based on sensor 115 data within which indicator may be actually located.

The vehicle computer 110 can determine a same number of dynamic map uncertainty values as a number of stored map uncertainty values specified by the map data. In an example in which the map data specifies a plurality of stored map uncertainty values, the vehicle computer 110 can compare each of the stored map uncertainty values to a corresponding dynamic map uncertainty value for respective indicators, e.g., the vehicle computer 110 can compare a covariance matrix specifying the stored map uncertainty values to a covariance matrix specifying the dynamic map uncertainty values. In an example in which the map data specifies one stored map uncertainty value, the vehicle computer 110 can compare the one stored map uncertainty value to one dynamic map uncertainty value, e.g., determined by combining (e.g., averaging and/or some other statistical measure) the plurality of dynamic map uncertainty values for the respective indicators. If the dynamic map uncertainty value is greater than or equal to the corresponding stored map uncertainty value, then the vehicle computer 110 operates the vehicle 105 through the operating area 200, e.g., along a travel path 215, based on the map data. For example, the vehicle computer 110 can actuate one or more vehicle components to move the vehicle 105 along a centerline 225 of the travel path 215 specified by the map data, e.g., to search for available sub-areas 210, to pick up a user at a specified location, etc.

If the dynamic map uncertainty value is less than the corresponding stored map uncertainty value, then the vehicle computer 110 updates the map data based on sensor data, as discussed below. Additionally, or alternatively, if the vehicle computer 110 fails to retrieve the stored map uncertainty value, e.g., the vehicle computer 110 may receive map data from a remote computer, e.g., associated with an owner of the operating area 200, that does not include a map uncertainty value, then the vehicle computer 110 can determine to update the map data based on sensor 115 data, as discussed below.

In an example in which the vehicle computer 110 determines a plurality of dynamic map uncertainty values, e.g., one dynamic map uncertainty value for respective indicators detected by the vehicle computer 110, the vehicle computer 110 can determine each of the plurality of dynamic map uncertainty values by combining (e.g., by averaging and/or using some other statistical measure) travel path 215 uncertainty values associated with the respective indicators and a pose uncertainty value. In an example in which the vehicle computer 110 determines one dynamic map uncertainty value, the vehicle computer 110 can determine the one dynamic map uncertainty value by combining (e.g., by averaging and/or using some other statistical measure) a total travel path 215 uncertainty value and the pose uncertainty value. In such an example, the vehicle computer 110 can determine the total travel path uncertainty value 215 by combining (e.g., by averaging and/or using some other statistical measure) the travel path 215 uncertainty values associated with the respective indicators.

Figure 3:
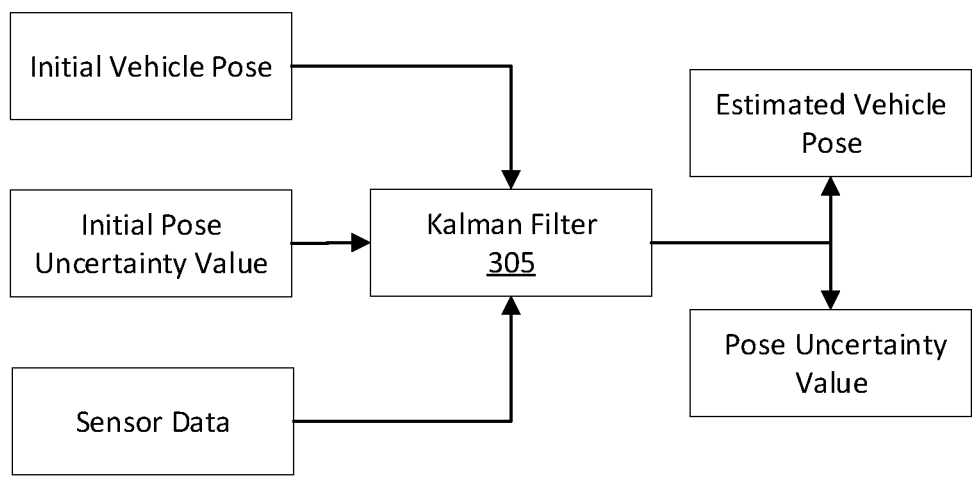
FIG. 3 is a block diagram of data flow in the vehicle.

Turning now to FIG. 3, to determine the pose uncertainty value, the vehicle computer 110 can estimate a pose of the vehicle 105 based on sensor 115 data. The pose of the vehicle 105 may be specified in six degrees-of-freedom. Six degrees-of-freedom conventionally and in this document refers to freedom of movement of an object in three-dimensional space, e.g., translation along three perpendicular axes and rotation about each of the three perpendicular axes. A six degree-of-freedom pose of the vehicle 105 means a location relative to a coordinate system (e.g., a set of coordinates specifying a positing in the coordinate system, e.g., X, Y, and Z coordinates) and an orientation (e.g., a yaw, a pitch, and a roll) about each axis in the coordinate system. The estimated pose can be constrained, e.g., to a plane defined by X and Y coordinates, such that the vehicle computer 110 can estimate three degrees-of-freedom, e.g., X and Y coordinates and yaw of the vehicle 105, based on the sensor 115 data and can determine the remaining three degrees-of-freedom, e.g., Z coordinate, pitch, and roll of the vehicle 105, based on the estimated three degrees-of-freedom.

To estimate the pose of the vehicle 105, the vehicle computer 110 can input an initial pose of the vehicle 105 and an initial pose uncertainty value into a Kalman filter 305. The vehicle computer 110 can, for example, receive location data, e.g., GPS data, from a sensor 115. The vehicle computer 110 can determine the initial pose of the vehicle 105 from the location data. For example, the location data may specify geo-coordinates such as latitude and longitude coordinates and an orientation of the vehicle 105 relative to a real-world, i.e., GPS, coordinate system. Additionally, the vehicle computer 110 can determine an initial pose uncertainty value based on an accuracy and/or resolution of the GPS data. For example, the vehicle computer 110 can store, e.g., in a memory of the vehicle computer 110, the accuracy and/or resolution of the sensor 115 that provides the GPS data.

The Kalman filter 305 works by forming a feedback loop between a prediction step, i.e., predicting the vehicle 105 pose and uncertainty value estimates for a next time step using prediction equations, and a measurement step, i.e., adjusting the predictions with measurements from the sensors 115 using measurement equations. The Kalman filter 305 then outputs an estimated vehicle 105 pose and a pose uncertainty value.

The Kalman filter 305 can be any suitable type such as a Kalman filter, Cubature Kalman filter, an Unscented Kalman Filter, a square root Kalman Filter, etc. For example, the Kalman filter 305 can be an extended Kalman filter 305. The prediction equations for an extended Kalman filter 305 are:

$$\hat{q}_{k+1|k} = f(\hat{q}_{k|k}, 0) \quad (1)$$

$$\Sigma_{k+1|k} F_k \Sigma_{k|k} F_k^T + G_k Q G_k^T \quad (2)$$

in which q is a vector of length m representing the vehicle 105 pose, the circumflex (∧) represents that the variable is an estimate, the subscript k+1|k indicates the variable at timestep k+1 given information through timestep k<k+1, f(·) is a function predicting the current vehicle 105 pose from the previous vehicle 105 pose, Σ is an m×m matrix of the error covariance of x, F is an m×m Jacobian matrix of the function f(·) G is a Jacobian matrix of the function f(·) the superscript T is the transpose operator, and Q is a matrix of the process noise covariance. For example, the vector q can be ($p_x$, $p_y$, ψ), in which p represents spatial or angular position; the subscripts x, y represent spatial dimensions; and ψ represents yaw. The function f(·) can be a physics-based model relating the previous vehicle 105 pose q to the current vehicle 105 pose q in the absence of process noise. The output of function f(·) is a vector of the same length as the vehicle 105 pose q. The matrix F is the Jacobian of f(·) with respect to the pose vector q, viz.:

$$F_k = \frac{\partial f}{\partial q}\Big|_{\hat{q}_{k|k}, 0} \quad (3)$$

and the matrix G is the Jacobian of f(·) with respect to the noise vector w, viz.:

$$G_k = \frac{\partial f}{\partial w}\Big|_{\hat{q}_{k|k}, 0} \quad (4)$$

The measurement equations are:

$$L_k = \Sigma^{k|k-1} H_k^T (H_k \Sigma_{k|k-1} H_k^T + R)^{-1} \quad (5)$$

$$\hat{q}_{k|k} = \hat{q}_{k|k-1} + L_k(z_k - h(\hat{q}_{k|k-1})) \quad (6)$$

$$\Sigma_{k|k} = \Sigma_{k|k-1} - L_k H_k \Sigma_{k|k-1} \quad (7)$$

in which L is an m×n matrix representing the Kalman gain, H is an n×m Jacobian matrix of the function h(·), h(·) is a function predicting the measurement vector z from the vehicle 105 pose q, R is an n×n matrix of the measurement noise covariance, and z is the vector of length n passed to the Kalman filter 305. The vector z is a vector from one of the sensors 115 that is passed to the Kalman filter 305, e.g., if the vector was from a GPS sensor 115, then z=(latitude, longitude). The function h(·) can be a physics-based model predicting the measurement vector z based on the vehicle 105 pose q. The output of the function h(·) is a vector of the same length as the measurement vector z. The matrix H is this Jacobian:

$$H_k = \frac{\partial h}{\partial q}\Big|_{\hat{q}_{k|k-1}} \quad (8)$$

There is a different function h( ) for each of the sensors 115, e.g., hGPs(·) for the GPS sensor 115, $h_v(·)$ for a vision sensor 115, etc.

Figure 4A:
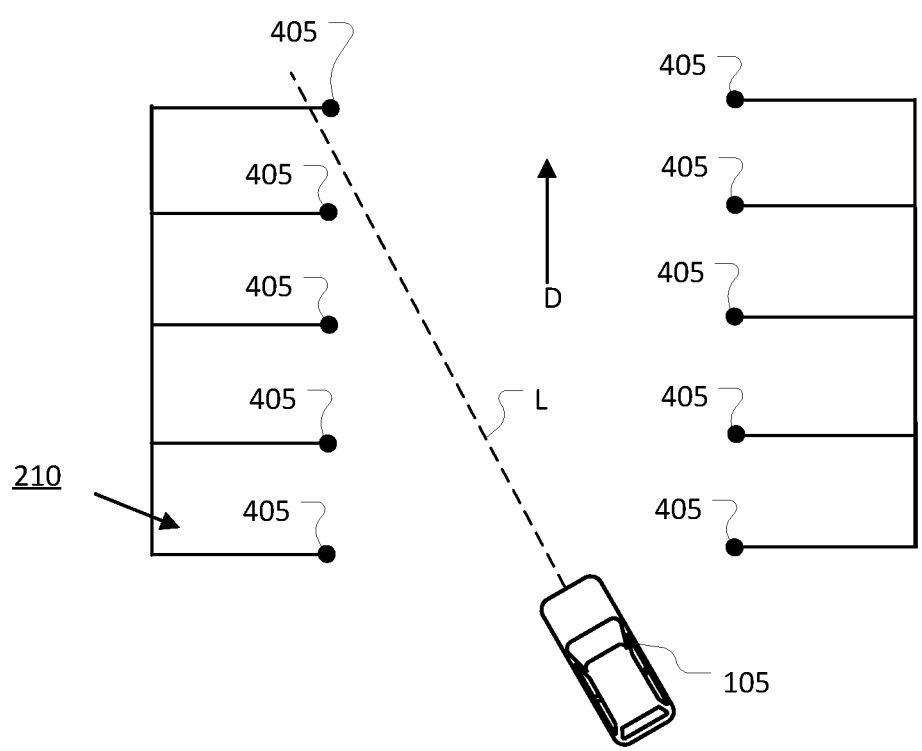
FIGS. 4A-4C are diagrams illustrating estimating lateral boundaries of an example travel path based on sets of detection points.
Figure 4B:
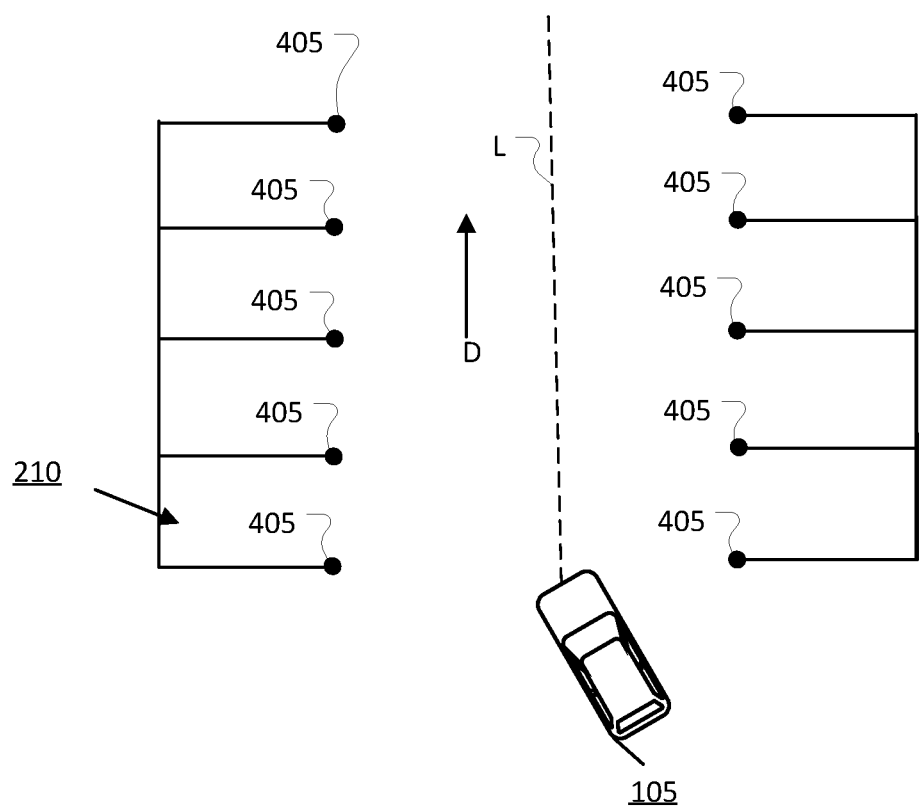
Figure 4C:
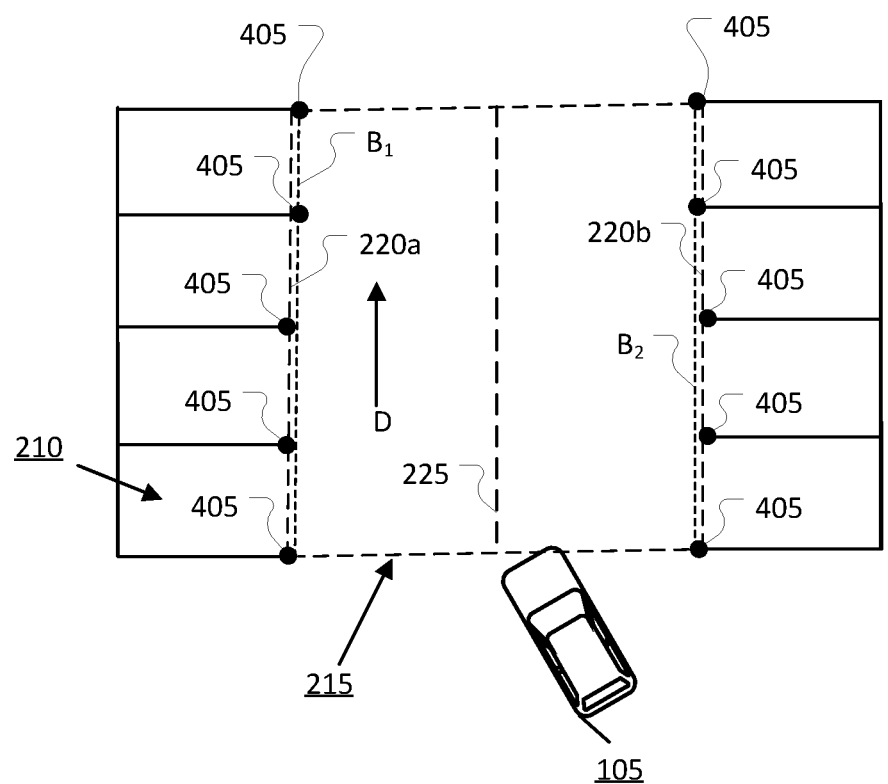

Turning now to FIGS. 4A-4C, to determine a travel path 215 uncertainty value for an indicator, the vehicle computer 110 can estimate the travel path 215, and specifically, the first and second lateral boundaries 220, based on sensor 115 data. For example, the sensors 115 can receive signals reflected from detection points 405 of an object, e.g., parked vehicles, curbs, poles, etc., and/or markings, e.g., painted and/or illuminated lines on a ground surface, alongside the travel path 215. As used herein, a "detection point" is a point on a surface of an object and/or on a marking from which a sensor 115 collects data. The vehicle computer 110 can then determine a detection point 405 of each received signal detected by each sensor 115, e.g., by using signal processing techniques. Each sensor 115 detects a plurality of detection points 405. The detection points 405 may be represented as a plurality of dots, as shown in FIGS. 4A-4C. The plurality of dots shown in FIGS. 4A-4C are merely illustrative of example detection points 405; it will be understood that typically many more detection points 405 will be detected, and in a less clear arrangement (e.g., not in what appears to be a straight line), than shown in the present figures.

The vehicle computer 110 could employ various techniques for fusing the plurality of detection points 405 detected by different sensors 115. Sensor 115 fusion is combining data from disparate sources together so that the resulting data has less uncertainty than if the data from each source were used individually, e.g., in creating a unified model of the surrounding environment of the vehicle 105. The sensor 115 fusion can be performed with one or more algorithms, e.g., Kalman filter (e.g., that may be a different Kalman filter than the Kalman filter 305 employed to estimate the vehicle pose and the pose uncertainty value, as discussed above), Bayesian networks, Dempster-Shafer, convolutional neural networks, etc.

Upon detecting the plurality of detection points 405, the vehicle computer 110 can determine a location of each detection point 405 with respect to a vehicle 105 coordinate system, e.g., a Cartesian coordinate system having an origin at a predetermined point on and/or in the vehicle 105. For example, the vehicle computer 110 can determine a distance from a sensor 115 to a detection point 405 based on sensor 115 data. Additionally, the vehicle computer 110 can determine an angle between a line defined by the distance and extending from the sensor 115 to the detection point 405 and an axis extending from the sensor 115 parallel to a longitudinal axis of the vehicle 105. A location of the sensor 115 with respect to the vehicle 105 coordinate system may be stored, e.g., in a memory of the vehicle computer 110. The location of the sensor 115 is combined with the distance and the angle, e.g., using geometric transformation, to determine the location of the detection point 405.

As one example, the sensor 115, e.g., a radar sensor 115, a lidar sensor 115, an ultrasonic sensor 115, etc., may emit a signal and receive a reflected signal reflected from the detection point 405. In such an example, the vehicle computer 110 can measure a time elapsed from emitting the signal to receiving the reflected signal. Based on the elapsed time, the vehicle computer 110 can determine the distance between the sensor 115 and the detection point 405, e.g., using a direct time-of-flight measurement technique. Based on an angle-of-arrival measurement technique, the vehicle computer 110 can determine the angle. During an angle of arrival measurement, the vehicle computer 110 can determine the direction of propagation of the received signal incident on the sensor 115 and measure a time distance of arrival between elements of the received signal at the sensor 115.

Upon determining a location of each of the plurality of detection points 405, the vehicle computer 110 can partition the plurality of detection points 405 into a first set of detection points 405a and a second set of detection points 405b laterally spaced from the first set of detection points 405a. In an example in which the travel path 215 is straight, the vehicle computer 110 can partition the plurality of detection points 405 by identifying a line L extending along or parallel to a vehicle 105 longitudinal axis (see FIG. 4A). The vehicle computer 110 can then rotate the line L relative to the plurality of detection points 405 to determine a maximum estimated width of the travel path 215 (see FIG. 4B). Rotating the line L to partition the plurality of detection points 405 such that the estimated width of the travel path 215 is maximized adjusts the partitioning of the detection points 405 based on an orientation of the vehicle 105 relative to the travel path 215, which allows the vehicle computer 110 to identify the lateral boundaries 220 (see FIG. 4C) of the travel path 215 from the first and second sets of detection points 405a, 405b, regardless of the vehicle's 105 orientation in the travel path 215. That is, the vehicle computer 110 rotates the line L to compensate for undesirable partitioning of the plurality of detection points 405, e.g., when the line L extends transverse to the direction of travel D of the travel path 215 (see FIG. 4A). Said differently, determining the maximum estimated width of the travel path 215 allows the vehicle computer 110 to determine that the line L extends parallel to the direction of travel D of the travel path 215 and partitions the plurality of detection points 405 in a desired manner (see FIG. 4C).

The vehicle computer 110 can determine a distance from the line L to a nearest detection point 405 on one side of the line L, e.g., using data processing techniques. By repeating this step for a nearest detection point 405 on the other side of the line L and summing the distances, the vehicle computer 110 can estimate a width of the travel path 215. The vehicle computer 110 can then rotate the line L relative to the detection points 405 such that some of the detection points 405 are on the opposite side of the line L. The vehicle computer 110 can then estimate an updated width of the travel path 215, e.g., in substantially the same manner as discussed immediately above. The vehicle computer 110 can compare the updated estimate width to the estimated width. As one example, the vehicle computer 110 can rotate the line L to sweep through a range of angles defined by the line L and the longitudinal axis of the vehicle 105. In such an example, the vehicle computer 110 can determine respective updated estimate widths at corresponding angles. The vehicle computer 110 can then compare the updated estimate widths to each other and select the maximum updated estimate width.

As another example, the vehicle computer 110 can rotate the line L such that the line L and the longitudinal axis of the vehicle 105 define a first angle within the range of angles. The vehicle computer 110 can then determine the updated estimated width at the first angle. If the updated estimated width is less than the estimated width, then the vehicle computer 110 can rotate the line L in an opposite direction such that the line L and the longitudinal axis of the vehicle 105 define a second angle within the range of angles. If the updated estimated width is greater than the estimated width, then the vehicle computer 110 can rotate the line L in a same direction such that the line L and the longitudinal axis of the vehicle 105 define a third angle within the range of angles. The vehicle computer 110 can continue to rotate the line L to estimate subsequent widths of the travel path 215 until the vehicle computer 110 determines a maximum width of the travel path 215, i.e., the subsequent estimated width is less than the previous estimated width regardless of a direction that the line L is rotated.

In an example in which the travel path 215 is curved, the vehicle computer 110 can partition the plurality of detection points 405 by determining a curved line l(x) extending among the plurality of detection points 405. The curved line l(x) is a model that predicts a line that divides the plurality of detection points 405, e.g., centerline between the plurality of detection points 405 line, traced by a continuously differential function, e.g., a polynomial, a circular arc, an elliptical arc, a Bezier curve, etc. As one non-limiting example, the curved line l(x) may be defined by a polynomial equation. In this example, the curved line l(x) predicts the line for a predetermined upcoming distance x, by determining a lateral coordinate, e.g., measured in meters:

$$l(x)=l_0+l_1 x+ \ldots +l_n x^n \qquad (9)$$

where $l_0, l_1, \ldots l_n$ are coefficients, e.g., determined by using grid search techniques, and n is a degree of the polynomial, e.g., selected to be less than or equal to a predetermined threshold, which may be specified by a vehicle and/or component manufacturer to reduce computational resources required to determine curved lines l(x) defined by various degrees of polynomials. Upon determining the curved line l(x), the vehicle computer 110 can determine respective distances d from the curved line l(x) to respective detection points 405 on one side of the line l(x) according to the equation:

$$d = \min_x \sqrt{(p_x - x)^2 + (p_y - l(x))^2} \qquad (10)$$

where $p_x$, $p_y$ are x and y coordinates of one detection point 405, and "min" indicates that the distance d is a minimum distance between the one detection point 405 and the curved line l(x). Upon determining the respective distances d, the vehicle computer 110 can compare the respective distances d to determine a minimum distance d from the curved line l(x) to a nearest detection point 405 on the one side of the curved line l(x). By repeating these steps for the detection points 405 on the other side of the curved line l(x), the vehicle computer 110 can determine a nearest detection point 405 on the other side of the curved line l(x). The vehicle computer 110 can then sum the respective minimum distances d associated with the respective nearest detection points 405 to estimate a width of the travel path 215. The vehicle computer 110 can then predict a new curved line l(x), e.g., by determining new coefficients $l_0, l_1, \ldots l_n$ according to grid search techniques and/or by selecting a new n such that the new n is less than or equal to the predetermined threshold. The vehicle computer 110 can then estimate an updated width of the travel path 215, e.g., in substantially the same manner as discussed immediately above. The vehicle computer 110 can compare the updated estimate width to the estimated width. The vehicle computer 110 can continue to estimate updated widths in this manner until the vehicle computer 110 determines a maximum width of the travel path 215.

Upon determining the maximum estimated width of the travel path 215, the vehicle computer 110 estimates the first lateral boundary 220a of the travel path 215 based on the first set of detection points 405a. The vehicle computer 110 can identify the first set of detection points 405a based on the detection points 405 that are located on one side of the line L. That is, each of the detection points 405 in the first set are laterally spaced from the line L in a first direction transverse to a vehicle-longitudinal axis, e.g., perpendicular to the line L. Upon identifying the first set of detection points 405a, the vehicle computer 110 can determine a first best fit line $B_1$ for the first set of detection points 405a (see FIG.

4C). The vehicle computer 110 can determine the first best fit line B₁through the first set of detection points 405a using known calculation methods, e.g., ordinary least squares, weighted least squares, linear regression, random sample consensus (RANSAC), etc. The first best fit line $B_1$ is a line through the first set of detection points 405a that best represents the first lateral boundary 220a. That is, the first best fit line $B_1$ approximates the first lateral boundary 220a of the travel path 215 relative to the vehicle 105. Said differently, the first best fit line $B_1$ approximates a lateral distance between the vehicle 105 and the first lateral boundary 220a. Upon determining the first best fit line $B_1$, the vehicle computer 110 can then determine a first travel path 215 uncertainty value based on the first set of detection points 405a and the first best fit line $B_1$, e.g., using known calculation methods such root mean square error (RMSE), residual standard error, etc. The first travel path 215 uncertainty value gives a range of uncertainty for the first lateral boundary 220a relative to the first best fit line $B_1$. That is, the first travel path 215 uncertainty value indicates a distance from which the first lateral boundary 220a can deviate from the first best fit line $B_1$.

Additionally, the vehicle computer 110 estimates the second lateral boundary 220b of the travel path 215 based on the second set of detection points 405b. The vehicle computer 110 can identify the second set of detection points 405b based on the detection points 405 that are disposed on the other side of the line L. That is, each detection point 405 in the second set is laterally spaced from the line L in a second direction opposite the first direction, e.g., perpendicular to the line L. Said differently, each detection point 405 in the second set of detection points 405b is laterally spaced from the first set of detection points 405a relative to the line L. Upon identifying the second set of detection points 405b, the vehicle computer 110 can determine a second best fit line $B_2$ through the second set of detection points 405b (see FIG. 4C), e.g., in substantially the same manner as discussed above regarding determining the first best fit line. The second best fit line $B_2$ is a line for the second set of detection points 405b that best represents the second lateral boundary 220b. That is, the second best fit line $B_2$ approximates the second lateral boundary 220b of the travel path 215 relative to the vehicle 105. Said differently, the second best fit line $B_2$ approximates a lateral distance between the vehicle 105 and the second lateral boundary 220b. Upon determining the second best fit line $B_2$, the vehicle computer 110 can then determine a second travel path 215 uncertainty value based on the second set of detection points 405b and the second best fit line $B_2$, e.g., in substantially the same manner as discussed above regarding the first travel path 215 uncertainty value. The second travel path 215 uncertainty value gives a range of uncertainty for second lateral boundary 220b relative to the second best fit line $B_2$. That is, the second travel path 215 uncertainty value indicates a distance from which the second lateral boundary 220b can deviate from the second best fit line $B_2$.

In an example in which the indicator is one of the lateral boundaries 220, the vehicle computer 110 determines that the travel path 215 uncertainty value for the line is the travel path 215 uncertainty value for the corresponding lateral boundary 220. In an example in which the indicator is not a lateral boundary 220 of the travel path 215, the vehicle computer 110 can determine the travel path 215 uncertainty value for the indicator by combining (e.g., by averaging and/or using some other statistical measure) the first and second travel path 215 uncertainty values.

As set forth above, upon failing to retrieve the stored map uncertainty value or determining that the dynamic map uncertainty value is less than the stored map uncertainty value, the vehicle computer 110 can update the map data based on sensor 115 data. For example, the vehicle computer 110 can enable a mapping operation mode that records and stores, e.g., in a memory of the vehicle computer 110, a travel path 215 along which a vehicle 105 operates in the operating area 200. As another example, the vehicle computer 110 can actuate the HMI 118 to display a virtual button that the user can select to enable the mapping operation mode. In the mapping operation mode, while the vehicle 105 operates along the travel path 215, the vehicle computer 110 is programmed to actuate one or more sensors 115 to record an environment including and around the travel path 215. As one example, a user may operate the vehicle 105 in the mapping operation mode along the travel path 215. As another example, the vehicle computer 110 may generate a path to operate the vehicle 105 in the mapping operation mode along the travel path 215 based on sensor 115 data.

As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \quad (11)$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

To record the travel path 215, the vehicle computer 110 determines the first lateral boundary 220a and the second lateral boundary 220b of the travel path 215 based on the sensor 115 data while the vehicle 105 operates along the travel path 215. For example, the vehicle computer 110 can detect detection points 405, e.g., on objects and/or markings, laterally spaced from the vehicle 105 in the travel path 215, e.g., in substantially the same manner as discussed above regarding detecting detection points 405. The lateral boundaries 220 can be determined in coordinates of the vehicle 105 coordinate system, e.g., in substantially the same manner as discussed above regarding determining the coordinates of the estimated lateral boundaries 220. That is, the vehicle computer 110 can determine respective locations of the lateral boundaries 220 relative to the vehicle 105.

Upon recording the travel path 215, the vehicle computer 110 can transform the first and second lateral boundaries 220 based on the estimated vehicle 105 pose. That is, the vehicle computer 110 generates transformed first and second lateral boundaries 220 that are determined in coordinates of the real-world coordinate system. The vehicle computer 110 determines the transformed first and second lateral boundaries 220 by combining the estimated vehicle 105 pose and each respective lateral boundary 220, e.g., using a geometric transformation to update the lateral boundaries 220 according to translational and rotational differences between the vehicle 105 coordinate system and the real-world coordinate system. For example, the vehicle 105 coordinate system may be translated relative to the real-world coordinate system such that the origin of the vehicle 105 coordinate system corresponds to the location indicated by the estimated vehicle 105 pose, and the vehicle 105 coordinate system may be rotated relative to the real-world coordinate system such that the x axis of the vehicle 105 coordinate system corresponds to the orientation indicated by the estimated vehicle 105 pose.

The vehicle computer 110 can determine a centerline 225 of the travel path 215 based on the transformed first and second lateral boundaries 220. In an example in which the transformed first and second lateral boundaries 220 are straight lines, the vehicle computer 110 can determine respective slopes of the transformed first and second lateral boundaries 220 with respect to the real-world coordinate system, e.g., using known calculation methods. In an example in which the respective slopes do not equal each other, i.e., the transformed first and second lateral boundaries 220 extend transverse to each other, the vehicle computer 110 can determine an intersection point of the transformed first and second lateral boundaries 220 and an intersection angle between the transformed first and second lateral boundaries 220 based on the respective slopes. The vehicle computer 110 can then determine the centerline 225 is a line that intersects the intersection point and bisects the intersection angle.

In an example in which the respective slopes are equal, i.e., the transformed first and second lateral boundaries 220 are parallel with each other, the vehicle computer 110 can determine a distance from the vehicle 105 to each transformed lateral boundary 220 using sensor 115 data, as discussed above. The vehicle computer 110 can then sum the distances to determine a width of the travel path 215. The vehicle computer 110 can determine that the centerline 225 is a line along the travel path 215 that bisects a line defined by the width of the travel path 215. That is, the centerline 225 is equidistance from each lateral boundary 220. The vehicle computer 110 can store the width of the travel path 215, e.g., in a memory of the vehicle computer 110.

In an example in which the transformed first and second lateral boundaries 220 are curved lines, the vehicle computer 110 can determine the centerline 225 based on graphs of the first and second best fit lines $B_1$, $B_2$. In this situation, the centerline 225 is defined as a graph (x, c(x)), where c(x) satisfies:

$$c(x) = \frac{f_1(x - n(x)) + f_2(x + n(x))}{2} \quad (12)$$

$$\tan^{-1} c(x) = \frac{\tan^{-1} f_1'(x - n(x)) + \tan^{-1} f_2'(x + n(x))}{2} \quad (13)$$

where $f_1(x)$ is a function defining the first best fit line $B_1$, $f_2(x)$ is a function defining the second best fit line $B_2$, $f_1'(x)$ is the derivative of $f_1(x)$, $f_2'(x)$ is the derivative of $f_2(x)$, n(x) is a continuously differentiable function, with $|n'(x)| < 1$, and n'(x) is the derivative of n(x). By satisfying equation 12, distances from c(x) to respective boundaries 220 in a direction normal to the centerline at x are equal. By satisfying equation 13, angles between tangents of the respective boundaries 220 and a tangent of the centerline 225 are equal.

The vehicle computer 110 may be programmed to stop recording the travel path 215 upon detecting a user input. For example, the vehicle computer 110 may actuate the HMI 118 to detect the user input disabling the mapping operation. For example, the HMI 118 may be programmed to display a virtual button on a touchscreen display that the user can select to disable the mapping operation mode. In other words, the HMI 118 may activate sensors 115 that can detect the user selecting the virtual button to disable the mapping operation mode. Upon detecting the user input, the HMI 118 can then provide the user input to the vehicle computer 110, and the vehicle computer 110 can disable the mapping operation mode and stop recording the travel path 215 based on the user input. Additionally, or alternatively, the vehicle computer 110 may be programmed to stop recording the travel path 215 upon determining that the vehicle 105 has departed the travel path 215, e.g., based on location data for the vehicle 105.

The vehicle computer 110 can update the map data to specify the transformed first and second lateral boundaries 220 and the centerline 225 of the travel path 215. Additionally, the vehicle computer 110 can update the map data to specify the dynamic map uncertainty value(s). Additionally, or alternatively, the vehicle computer 110 can update the map data to identify intersections of two or more travel paths 215. As used herein, an "intersection" is an area at which two of more travel paths 215 cross each other. The vehicle computer 110 can identify an intersection based on sensor 115 data. For example, the vehicle computer 110 can detect, e.g., via successive frames of image data, other vehicles 105 moving substantially orthogonally across the travel path 215. As another example, the vehicle computer 110 can detect a gap in a lateral boundary 220 of a travel path 215, e.g., a length along which sensors 115 detect no objects or markings defining the lateral boundary 220 along the travel path 215. In such an example, the sensors 115 may detect objects and/or markings on opposite sides of the gap defining a lateral boundary 220 extending substantially orthogonally to the travel path 215. In this situation, the vehicle computer 110 can determine that the lateral boundary 220 of the travel path 215 intersects lateral boundaries 220 of another travel path 215.

The vehicle computer 110 can store the updated map data, e.g., in a memory of the vehicle computer 110. Additionally, or alternatively, the vehicle computer 110 can provide the updated map data to the remote server computer 140. The vehicle computer 110 can then operate the vehicle 105 through the operating area 200, i.e., along the travel path 215, based on the updated map data. For example, the vehicle computer 110 can actuate one or more vehicle components 125 to move the vehicle 105 along the centerline 225 of the travel path 215 in the operating area 200, e.g., to search for available sub-areas 210, to pick up a user at a specified location, etc.

The remote server computer 140 may be programmed to generate (and/or update) the map data of the operating area 200, e.g., stored in the second memory, and specify the stored map uncertainty data based on aggregated data. Aggregated data means data from a plurality of vehicle computers 110 that provide messages and then combining (e.g., by averaging and/or using some other statistical measure) the results. That is, the remote server computer 140 may be programmed to receive messages from a plurality of vehicle computers 110 indicating a travel path 215 in an operating area 200 and one or more dynamic map uncertainty values based on vehicle 105 data of a plurality of vehicles 105. Based on the aggregated data indicating the travel path 215 and the dynamic map uncertainty value(s) (e.g., an average number of messages, a percentage of messages, etc., indicating the dynamic map uncertainty value(s) being less than the stored map uncertainty value(s)), and taking advantage of the fact that messages from different vehicles 105 are provided independently of one another, the remote server computer 140 can generate (and/or update) the map data to specify the travel path 215 and the stored map uncertainty value based on the vehicle 105 data. The remote server computer 140 can then transmit the map data to a plurality of vehicles 105, including the vehicle 105, e.g., via the network 135.

Figure 5:
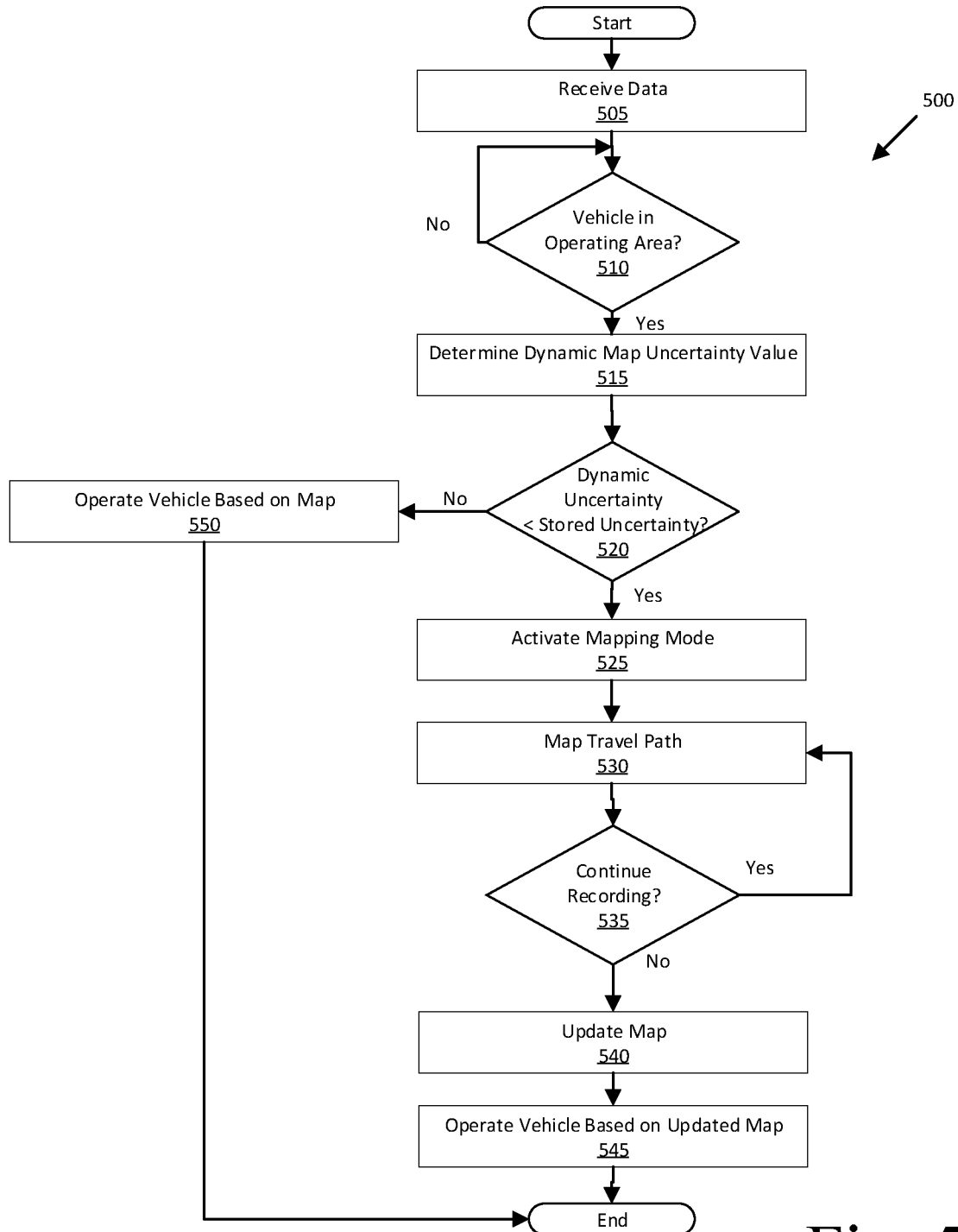
FIG. 5 is a flowchart of an example process for operating the vehicle.

FIG. 5 is a diagram of an example process 500 for determining whether to update map data for a travel path 215 in an operating area 200. The process 500 begins in a block 505. The process 500 can be carried out by a vehicle computer 110 included in the vehicle 105 executing program instructions stored in a memory thereof.

In the block 505, the vehicle computer 110 receives data from one or more sensors 115, e.g., via a vehicle 105 network 135, from a remote server computer 140, e.g., via a network 135, and/or from a computer in another vehicle 105, e.g., via V2V communications. For example, the vehicle computer 110 can receive location data, e.g., geo-coordinates, of the vehicle 105, e.g., from a sensor 115, a navigation system, etc. Additionally, the vehicle computer 110 can receive image data, e.g., from one or more image sensors 115. The image data may include data about the environment around the vehicle 105, e.g., the operating area 200, a sub-area 210, one or more objects, etc. The process 500 continues in a block 510.

In the block 510, the vehicle computer 110 determines whether the vehicle 105 is in an operating area 200 or a road area (not shown) based on the received data, e.g., location data, as discussed above. If the vehicle computer 110 determines that the vehicle 105 is in the operating area 200, then the process 500 continues in a block 515. Otherwise, the process 500 remains in the block 510.

In the block 515, the vehicle computer 110 determines one or more dynamic map uncertainty value(s). The vehicle computer 110 can determine a pose uncertainty value and one or more travel path 215 uncertainty value(s) upon estimating a vehicle 105 pose and lateral boundaries 220 of a travel path 215, as discussed above. The vehicle computer 110 combines the pose uncertainty value and the travel path 215 uncertainty value(s) to determine the dynamic map uncertainty value(s), as discussed above. The process 500 continues in a block 520.

In the block 520, the vehicle computer 110 determines whether the dynamic map uncertainty value(s) is(are) less than a corresponding stored map uncertainty value. The vehicle computer 110 can retrieve the stored map uncertainty value(s) from the map data, as discussed above. If the dynamic map uncertainty value(s) is(are) less than the corresponding stored map uncertainty value (or the vehicle computer 110 fails to retrieve the stored map uncertainty value(s)), then the process 500 continues in a block 525. Otherwise, the process 500 continues in a block 550.

In the block 525, the vehicle computer 110 enables the mapping operation mode, as discussed above. The vehicle computer 110 can, for example, operate the vehicle 105 in the mapping operation mode along the travel path 215. Alternatively, a user can operate the vehicle 105 in the mapping operation mode along the travel path 215. The process 500 continues in a block 530.

In the block 530, the vehicle computer 110 records the travel path 215 while the vehicle 105 operates along the travel path 215. The vehicle computer 110 can receive sensor 115 data and determine first and second lateral boundaries 220b of the travel path 215 based on the sensor 115 data, as discussed above. The process 500 continues in a block 535.

In the block 535, the vehicle computer 110 determines whether to continue recording the travel path 215. For example, the vehicle computer 110 can stop recording the travel path 215 based on receiving a user input disabling the mapping operation mode, e.g., via the HMI 118, as discussed above. If the vehicle computer 110 receives the user input, then the vehicle computer 110 determines to stop recording the travel path 215. Otherwise, the vehicle computer 110 may determine to continue recording the travel path 215. If the vehicle computer 110 determines to stop recording the travel path 215, then the process 500 continues in a block 540. Otherwise, the process 500 returns to the block 530.

In the block 540, the vehicle computer 110 updates the map data for the operating area 200. Upon determining the lateral boundaries 220 of the travel path 215, the vehicle computer 110 can transform the lateral boundaries 220 of the travel path 215 based on the vehicle 105 pose thereby generating transformed lateral boundaries 220, as discussed above. Additionally, the vehicle computer 110 determines a centerline 225 for the travel path 215 based on the transformed lateral boundaries 220, as discussed above. The vehicle computer 110 can update the map data to specify the transformed lateral boundaries 220, the centerline 225, and the dynamic map uncertainty value(s). The vehicle computer 110 can then provide the updated map data to the remote server computer 140, which can update the map data further based on aggregated data, as discussed above. The process 500 continues in a block 545.

In the block 545, the vehicle computer 110 operates the vehicle 105 through the operating area 200, e.g., along the travel path 215, based on the updated map data. For example, the vehicle computer 110 can actuate one or more vehicle components to move the vehicle 105 along the centerline 225 of the travel path 215 specified by the updated map data. The process 500 ends following the block 545.

In the block 550, the vehicle computer 110 operates the vehicle 105 through the operating area 200, e.g., along the travel path 215, based on the map data. For example, the vehicle computer 110 can actuate one or more vehicle components to move the vehicle 105 along a centerline 225 of the travel path 215 specified by the map data. The process 500 ends following the block 550.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:

while a vehicle is in an area, retrieve a stored map uncertainty value of map data for the area, wherein the stored map uncertainty value gives a range of uncertainty for at least one indicator of a travel path specified by the map data;

upon estimating the travel path and a vehicle pose, determine a dynamic map uncertainty value based on a pose uncertainty value and a travel path uncertainty value, wherein the pose uncertainty value gives a range of uncertainty for the vehicle pose in three degrees-of-freedom based on vehicle sensor data, and the travel path uncertainty value gives a range of uncertainty for the at least one indicator of the estimated travel path based on vehicle sensor data;

upon determining that the dynamic map uncertainty value is less than the stored map uncertainty value, update the map data based on the vehicle sensor data; and upon updating the map data, operate the vehicle based on the updated map data.

2. The system of claim 1, wherein the instructions further include instructions to, upon determining that the dynamic map uncertainty value is greater than or equal to the stored map uncertainty value, maintain the map data.

3. The system of claim 2, wherein the instructions further include instructions to operate the vehicle based on the map data.

4. The system of claim 1, wherein the instructions further include instructions to, upon failing to retrieve the stored map uncertainty value, update the map data based on the vehicle sensor data.

5. The system of claim 1, wherein the instructions further include instructions to estimate the vehicle pose based on output of a Kalman filter.

6. The system of claim 1, wherein the instructions further include instructions to:
estimate a first lateral boundary of the travel path based on a first set of detection points;
estimate a second lateral boundary of the travel path based on a second set of detection points spaced from the first set; and
determine the travel path uncertainty value based on a first best fit line for the first set of detection points and a second best fit line for the second set of detection points.

7. The system of claim 1, wherein the instructions further include instructions to:
determine, based on the vehicle sensor data, a first lateral boundary and a second lateral boundary of the travel path in coordinates relative to a vehicle-coordinate system; and
transform, based on the estimated vehicle pose, the first and second lateral boundaries to coordinates relative to a real-world coordinate system, thereby generating transformed lateral boundaries.

8. The system of claim 7, wherein the instructions further include instructions to:
determine a center line of the travel path in coordinates relative to the real-world coordinate system based on the transformed first and second lateral boundaries; and
operate the vehicle along the center line of the travel path.

9. The system of claim 1, wherein the instructions further include instructions to, upon updating the map data, update the stored map uncertainty value based on the dynamic map uncertainty value.

10. The system of claim 9, wherein the instructions further include instructions to provide the updated map data, including the updated map uncertainty value, to a remote computer.

11. The system of claim 10, further comprising the remote computer including a second processor and a second memory, the second memory storing instructions executable by the second processor to update a map based on aggregated data including updated map data from a plurality of vehicles.

12. The system of claim 11, wherein the instructions further include instructions to update the stored map uncertainty value based on aggregated data including updated map uncertainty values from a plurality of vehicles.

13. The system of claim 1, further comprising a remote computer including a second processor and a second memory, the second memory storing instructions executable by the second processor to generate a map based on aggregated data including map data from a plurality of vehicles.

14. A method, comprising:
while a vehicle is in an area, retrieving a stored map uncertainty value of map data for the area, wherein the stored map uncertainty value gives a range of uncertainty for at least one indicator of a travel path specified by the map data;
upon estimating the travel path and a vehicle pose, determining a dynamic map uncertainty value based on a pose uncertainty value and a travel path uncertainty value, wherein the pose uncertainty value gives a range of uncertainty for the vehicle pose in three degrees-of-freedom based on vehicle sensor data, and the travel path uncertainty value gives a range of uncertainty for the at least one indicator of the estimated travel path based on vehicle sensor data;
upon determining that the dynamic map uncertainty value is less than the stored map uncertainty value, updating the map data based on the vehicle sensor data; and
upon updating the map data, operating the vehicle based on the updated map data.

15. The method of claim 14, further comprising, upon determining that the dynamic map uncertainty value is greater than or equal to the stored map uncertainty value, operating the vehicle based on the map data.

16. The method of claim 14, further comprising, upon failing to retrieve the stored map uncertainty value, updating the map data based on the vehicle sensor data.

17. The method of claim 14, further comprising estimating the vehicle pose based on output of a Kalman filter.

18. The method of claim 14, further comprising:
estimating a first lateral boundary of the travel path based on a first set of detection points;
estimating a second lateral boundary of the travel path based on a second set of detection points spaced from the first set; and
determining the travel path uncertainty value based on a first best fit line for the first set of detection points and a second best fit line for the second set of detection points.

19. The method of claim 14, further comprising:
determining, based on the vehicle sensor data, a first lateral boundary and a second lateral boundary of the travel path in coordinates relative to a vehicle-coordinate system;
transforming, based on the estimated vehicle pose, the first and second lateral boundaries and the center line to coordinates relative to a real-world coordinate system;
determining a center line of the travel path in coordinates relative to the real-world coordinate system based on the transformed first and second lateral boundaries; and
operating the vehicle along the center line of the travel path.

20. The method of claim 14, further comprising, upon updating the map data, updating the stored map uncertainty value based on the dynamic map uncertainty value.

* * * * *